United States Patent
Suzuki et al.

(10) Patent No.: US 10,866,743 B2
(45) Date of Patent: Dec. 15, 2020

(54) STORAGE CONTROL DEVICE USING INDEX INDICATING ORDER OF ADDITIONAL WRITING OF DATA, STORAGE CONTROL METHOD USING INDEX INDICATING ORDER OF ADDITIONAL WRITING OF DATA, AND RECORDING MEDIUM RECORDING PROGRAM USING INDEX INDICATING ORDER OF ADDITIONAL WRITING OF DATA

(71) Applicant: FUJITSU LIMITED, Kawasaki (JP)

(72) Inventors: Yusuke Suzuki, Kawasaki (JP); Yusuke Kurasawa, Nagano (JP); Norihide Kubota, Kawasaki (JP); Yoshihito Konta, Kawasaki (JP); Marino Kajiyama, Yokohama (JP); Yuji Tanaka, Inagi (JP); Toshio Iga, Kawasaki (JP); Kazuya Takeda, Kawasaki (JP); Takeshi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 30 days.

(21) Appl. No.: 16/260,308

(22) Filed: Jan. 29, 2019

(65) Prior Publication Data
US 2019/0243563 A1 Aug. 8, 2019

(30) Foreign Application Priority Data

Feb. 2, 2018 (JP) .................................. 2018-017655

(51) Int. Cl.
*G06F 3/06* (2006.01)
*G06F 12/02* (2006.01)

(52) U.S. Cl.
CPC ............ *G06F 3/0619* (2013.01); *G06F 3/061* (2013.01); *G06F 3/0604* (2013.01);
(Continued)

(58) Field of Classification Search
CPC .................................................... G06F 3/0619
See application file for complete search history.

(56) References Cited

U.S. PATENT DOCUMENTS

2015/0143032 A1  5/2015  Hashimoto
2017/0139842 A1* 5/2017  Moriguchi .......... G06F 12/0802

FOREIGN PATENT DOCUMENTS

JP    2016-021246 A     2/2016
WO   WO-2015162766 A1 * 10/2015  ............... G06F 3/06
WO   2016/185573 A1    11/2016

* cited by examiner

*Primary Examiner* — David E Martinez
(74) *Attorney, Agent, or Firm* — Fujitsu Patent Center

(57) ABSTRACT

A storage control device, includes: a memory configured to store meta information and map information, the meta information associates a logical address to identify data from an information processing device which uses a storage with a data block identifier to identify a data block used for an arrangement of the data on the storage and including a header area and a payload area and an index indicating an order of additional writing of the data, the map information associates the data block identifier with a physical identifier indicating a physical position on the storage; and a processor specifies the data block and a write position in a payload area based on the physical identifier and the index, writes the data in the specified data block and performs a write control to write a data unit header including an offset and a data length at a position designated by the index.

17 Claims, 19 Drawing Sheets

(52) U.S. Cl.
CPC ........ *G06F 3/0689* (2013.01); *G06F 12/0246* (2013.01); *G06F 2212/1016* (2013.01); *G06F 2212/7201* (2013.01)

FIG. 8A

| OFFSET | BYTE #1 | BYTE #2 | BYTE #3 | BYTE #4 |
|---|---|---|---|---|
| 0x00 | Status | Data Unit Index | Checksum | |
| 0x04 | Node No. | | Reserved | |
| 0x08 | | | BID (Upper 2 BYTES) | |
| 0x0c | BID (Lower 4 BYTES) | | | |
| 0x10 | Data Block No. | | | |
| 0x14 | | | | |
| 0x18 | Reserved | | | |
| 0x1c | Reserved | | | |

| MEMBER NAME | SIZE (BYTE) | OUTLINE |
|---|---|---|
| Status | 1 | INDICATING WHETHER LOGICAL-PHYSICAL META IS VALID (WHETHER LOGICAL-PHYSICAL META HAS BEEN ALLOCATED TO CORRESPONDING LBA) 0: UNUSED (NOT ALLOCATED) 1: ALLOCATED |
| Data Unit Index | 1 | INDEX POSITION OF DATA UNIT |
| Checksum | 2 | CHECKSUM VALUE |
| Node No. | 2 | OWN NODE NUMBER |
| BID (Upper) | 2 | BLOCK ID (POSITION INFORMATION) |
| BID (Lower) | 4 | BLOCK ID (POSITION INFORMATION) |
| Data Block No. | 8 | DATA BLOCK NUMBER ALLOCATED TO SLOT |

FIG. 8B

| OFFSET | BYTE #1 | BYTE #2 | BYTE #3 | BYTE #4 |
|---|---|---|---|---|
| 0x00 | Data Unit Status | Reserved | Checksum | |
| 0x04 | Offset Block Count | | Compression Byte Size | |
| 0x08 | CRC (2 BYTES ×16) | | | |
| ... | | | | |
| 0x24 | | | | |

| MEMBER NAME | SIZE (BYTE) | OUTLINE |
|---|---|---|
| Data Unit Status | 1 | INDICATING WHETHER ADDITIONAL WRITING OF DATA UNIT IS POSSIBLE OR IMPOSSIBLE · 0: (ADDITIONAL WRITING IS POSSIBLE) THERE IS NO DATA UNIT · 1: (ADDITIONAL WRITING IS IMPOSSIBLE) THERE IS DATA UNIT |
| Checksum | 2 | CHECKSUM VALUE |
| Offset Block Count | 2 | OFFSET VALUE FROM HEAD OF PAYLOAD AREA OF DATA UNIT THAT HAS BEEN ADDITIONALLY WRITTEN (BLOCK COUNT) |
| Compression Byte Size | 2 | COMPRESSION SIZE (BYTE) |
| CRC | 32 | CRC VALUE (2 BYTES ×16) |

FIG. 8C

| OFFSET | BYTE #1 | BYTE #2 | BYTE #3 | BYTE #4 |
|---|---|---|---|---|
| 0x00 | Data Block Full Flag | Write Data Unit Count | Next Data Unit Header Index | Reserved |
| 0x04 | Reserved | | | |
| 0x08 | Next Write Block Offset | | | |
| 0x0C | | | | |
| 0x10 | Data Block No. | | | |
| 0x14 | | | | |
| TO | Reserved | | | |
| 0xBC | | | | |

| MEMBER NAME | SIZE (BYTE) | OUTLINE |
|---|---|---|
| Data Block Full Flag | 1 | FLAG INDICATING WHETHER ADDITIONAL WRITING OF DATA UNIT IS POSSIBLE · 0 (POSSIBLE): REMAINING WRITING CAPACITY OF DATA BLOCK IS THRESHOLD VALUE OR MORE AND THERE IS EMPTY CAPACITY · 1 (IMPOSSIBLE): REMAINING WRITING CAPACITY OF DATA BLOCK IS LESS THAN THRESHOLD VALUE AND THERE IS NO EMPTY CAPACITY |
| Write Data Unit Count | 1 | NUMBER OF DATA UNITS THAT HAVE BEEN ADDITIONALLY WRITTEN |
| Next Data Unit Header Index | 1 | INDEX OF DATA UNIT HEADER TO BE WRITTEN NEXT |
| Next Write Block Offset | 8 | OFFSET POSITION FROM HEAD OF PAYLOAD AREA OF DATA UNIT TO BE WRITTEN NEXT (BLOCK COUNT) |
| Data Block No. | 8 | DATA BLOCK NUMBER ALLOCATED TO SLOT |

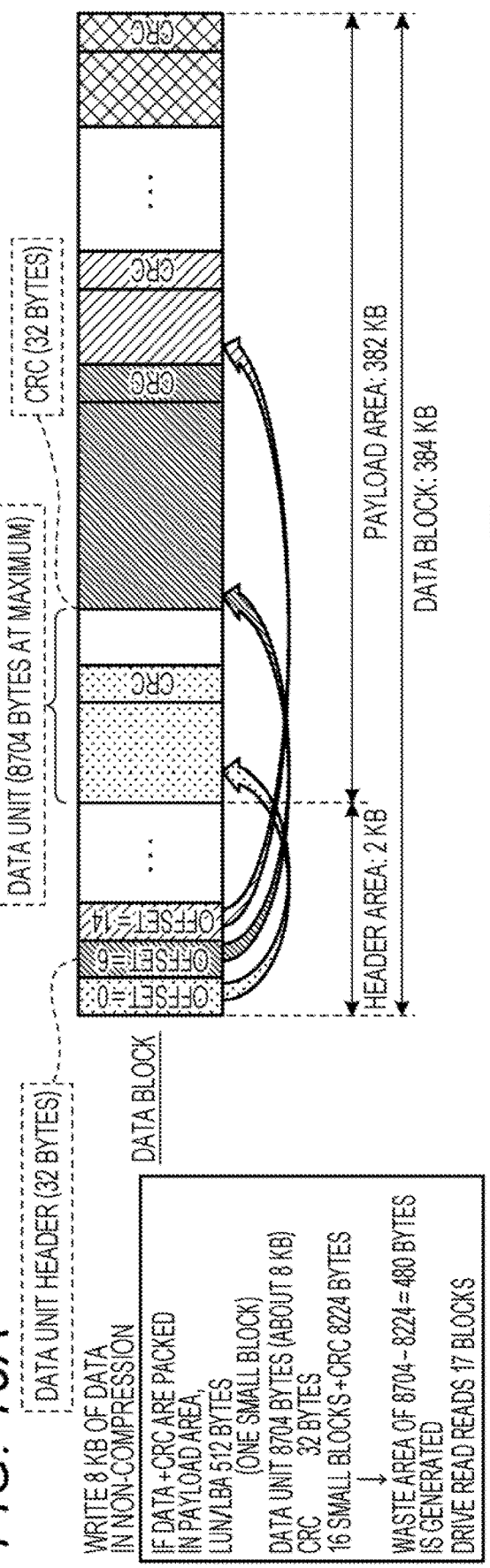
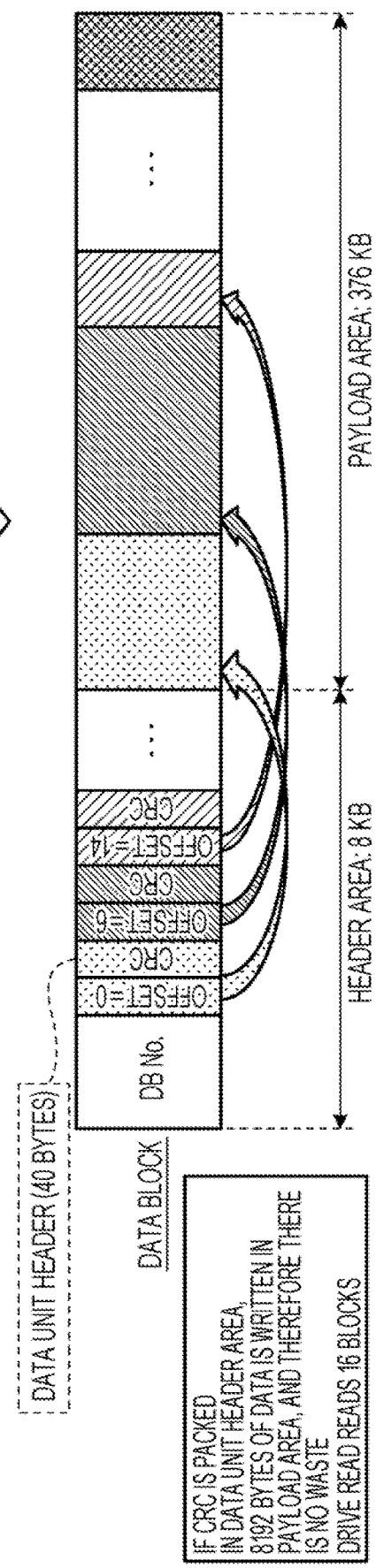
FIG. 10A
FIG. 10B

STORAGE CONTROL DEVICE USING INDEX INDICATING ORDER OF ADDITIONAL WRITING OF DATA, STORAGE CONTROL METHOD USING INDEX INDICATING ORDER OF ADDITIONAL WRITING OF DATA, AND RECORDING MEDIUM RECORDING PROGRAM USING INDEX INDICATING ORDER OF ADDITIONAL WRITING OF DATA

CROSS-REFERENCE TO RELATED APPLICATION

This application is based upon and claims the benefit of priority of the prior Japanese Patent Application No. 2018-17655, filed on Feb. 2, 2018, the entire contents of which are incorporated herein by reference.

FIELD

The embodiment discussed herein is related to a storage control device, a storage control method, and a storage control program.

BACKGROUND

Recently, a storage medium of a storage device has been shifted from a hard disk drive (HDD) to a flash memory such as a solid state drive (SSD) having a higher access speed.

Related art is disclosed in Japanese Laid-open Patent Publication No. 2016-21246 and International Publication Pamphlet No. WO 2016/185573.

SUMMARY

According to an aspect of the embodiments, a storage control device, includes: a memory configured to store meta information and map information, wherein the meta information associates a logical address to identify data from an information processing device which uses a storage with a data block identifier to identify a data block which is used for an arrangement of the data on the storage and includes a header area with a capacity to store header information related to data corresponding to a plurality of indexes and a payload area with a capacity to store data corresponding to the plurality of indexes and an index indicating an order of additional writing of the data in the data block, wherein the map information associates the data block identifier with a physical identifier indicating a physical position on the storage for the data block; and a processor configured to: specify the data block and a write position in a payload area of the data block based on the physical identifier of the data block and the index; write the data in the specified data block; and perform a write control to write a data unit header including an offset indicating the write position in the data block and a data length indicating a length of the data at a position which is designated by the index in the header area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8A is a diagram illustrating a format of a logical-physical meta;

FIG. 8B is a diagram illustrating a format of a data unit header;

FIG. 8C is a diagram illustrating a format of a data block header;

FIGS. 10A and 10B are diagrams for explaining improvement in capacity efficiency;

DESCRIPTION OF EMBODIMENTS

The SSD makes it impossible to perform overwriting directly on a memory cell, and for example, makes data written after data is erased in units of 1 megabyte (MB) size block.

For this reason, in a case of updating a part of data in a block, the other data in the block is saved, the block is erased, and then the saved data and update data are written. Therefore, processing of updating small data is slow as compared with the size of the block. The SSD has an upper limit on the number of times of writing. Therefore, the SSD desirably avoids updating small data as compared with the size of a block as much as possible. Therefore, in a case of updating a part of data in a block, the other data in the block and update data are written in a new block.

A storage device using SSD requires a data structure, in a case of updating a part of data in a block, capable of not only reducing the number of times of writing by writing the other data in the block and update data in a new block, but also further reducing the number of times of writing.

A data structure capable of reducing the number of times of writing may be provided.

Hereinafter, embodiments of a storage control device, a storage control method, and a storage control program disclosed by the present application will be described in detail with reference to the drawings. The embodiments do not limit the technology disclosed.

Embodiment

Figure 1:
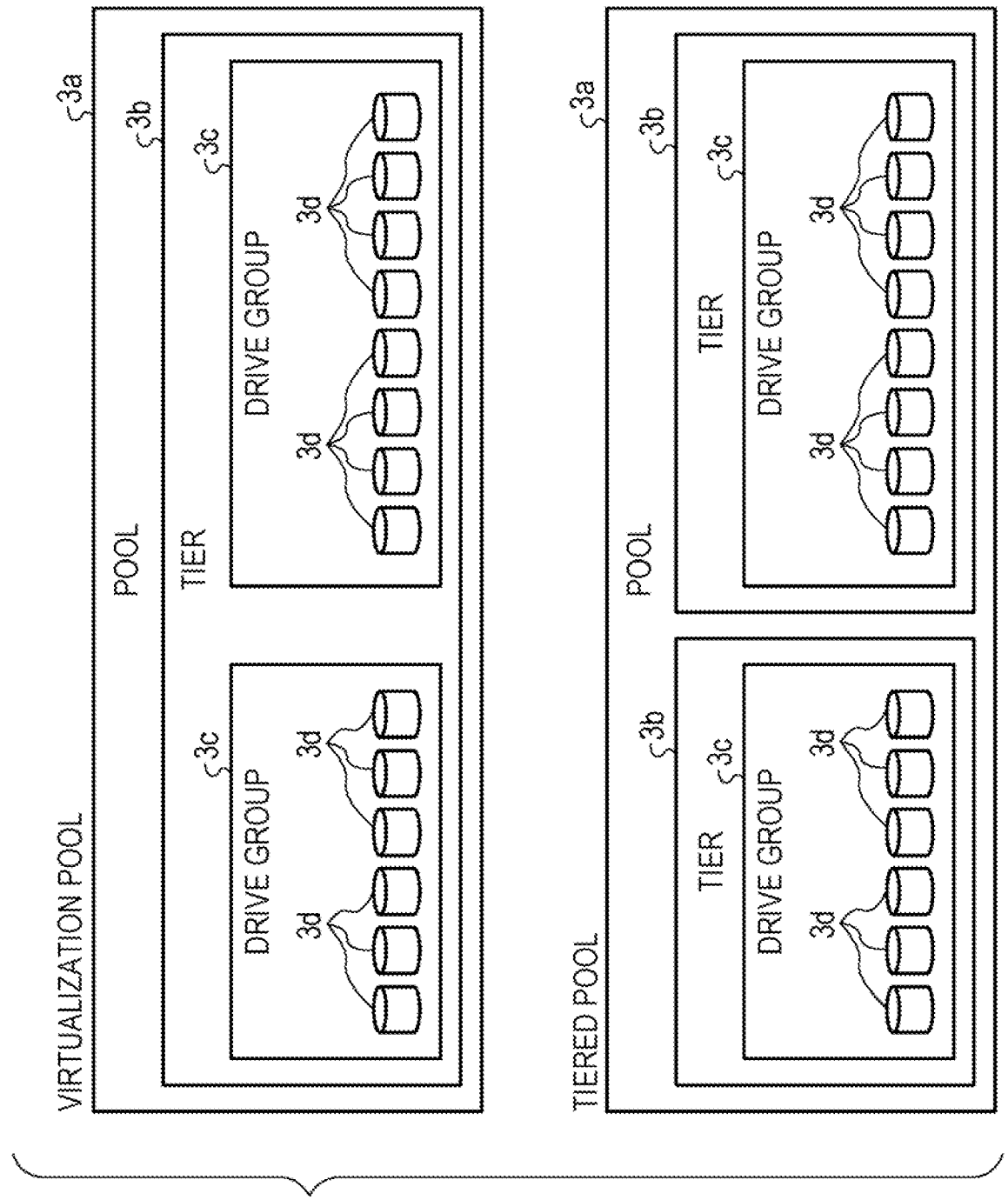
FIG. 1 is a diagram illustrating a storage configuration of a storage device according to an embodiment.

First, a storage configuration of the storage device according to an embodiment will be described. FIG. 1 is a diagram illustrating a storage configuration of the storage device according to an embodiment. As illustrated in FIG. 1, the storage device according to an embodiment uses a plurality of SSDs 3d to manage a pool 3a based on redundant arrays of inexpensive disks (RAID). The storage device according to an embodiment includes a plurality of the pools 3a.

The pools 3a include a virtualization pool and a tiered pool. The virtualization pool includes one tier 3b, and the tiered pool includes two or more tiers 3b. The tier 3b includes one or more drive groups 3c. Each of the drive groups 3c is a group of the SSDs 3d and includes 6 to 24 SSDs 3d. For example, three of the six SSDs 3d that store one stripe are used for storing user data (hereinafter simply referred to as "data"), two are used for parity storage, and one is used for hot spare. Each of the drive groups 3c may include 25 or more SSDs 3d.

Next, metadata used by the storage control device according to an embodiment will be described. Here, the metadata is data used by the storage control device in order to manage data stored in the storage device.

Figure 2:
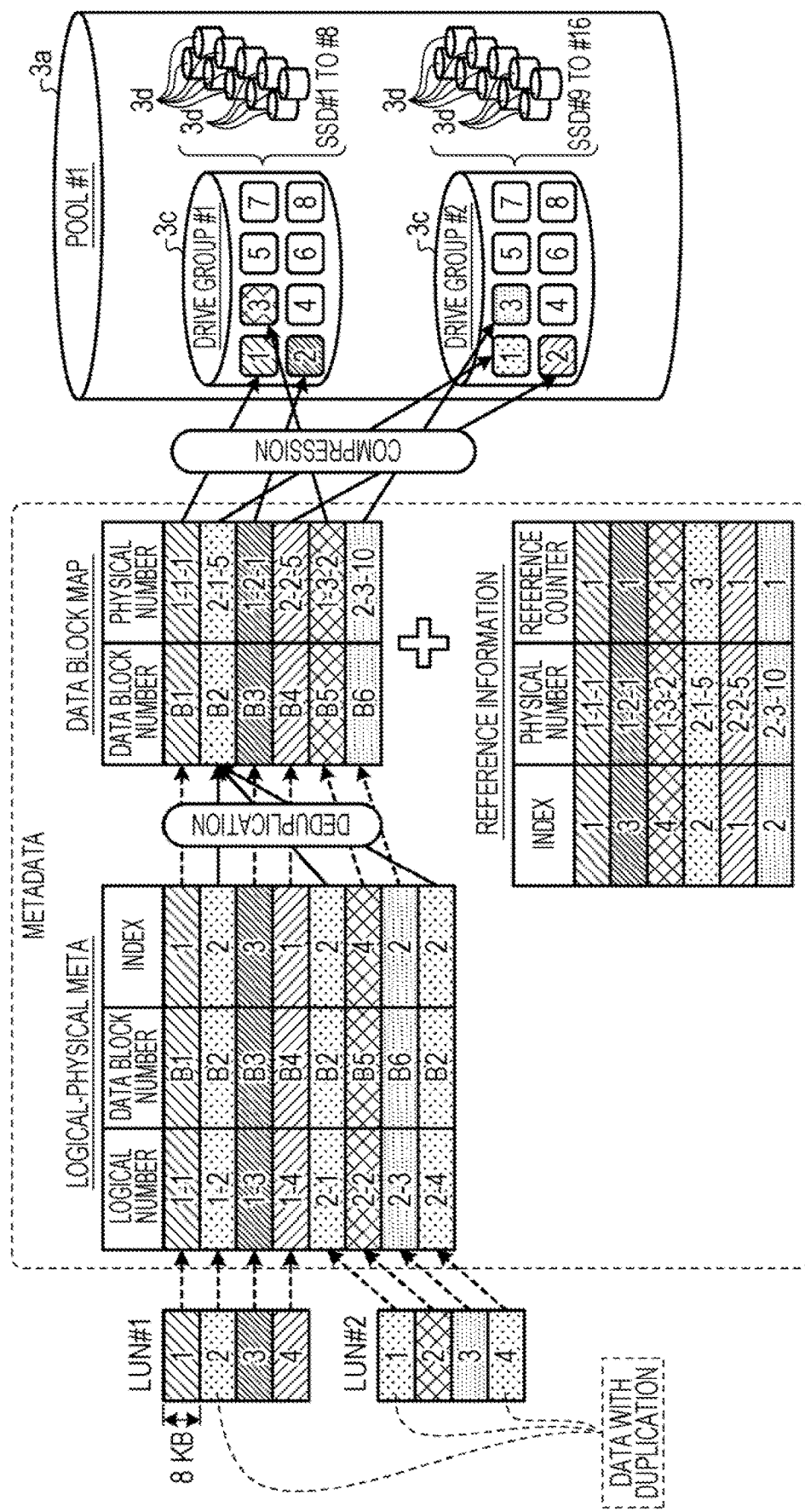
FIG. 2 is a diagram for explaining metadata used by a storage control device according to an embodiment.

FIG. 2 is a diagram for explaining metadata used by the storage control device according an embodiment. As illustrated in FIG. 2, metadata includes a logical-physical meta, a data block map, and reference information.

The logical-physical meta is information associating a logical number with a data block number and an index. The logical number is a logical address used for identifying data by an information processing device using a storage device, and is a combination of a logical unit number (LUN) and a logical block address (LBA). The size of the logical block is 8 KB (kilobytes), which is a unit size for deduplication. Processing by a command from the information processing device (host) to the storage device is in units of 512 bytes. Therefore, in the present embodiment, in order to make deduplication more efficient, a set of blocks of 8 KB (8192 bytes) corresponding to an integer multiple of 512 bytes is assumed to be one logical block here. The data block number is a number for identifying a data block storing 8 KB of data identified by a logical number. The index is a data number in a data block.

Figure 3:
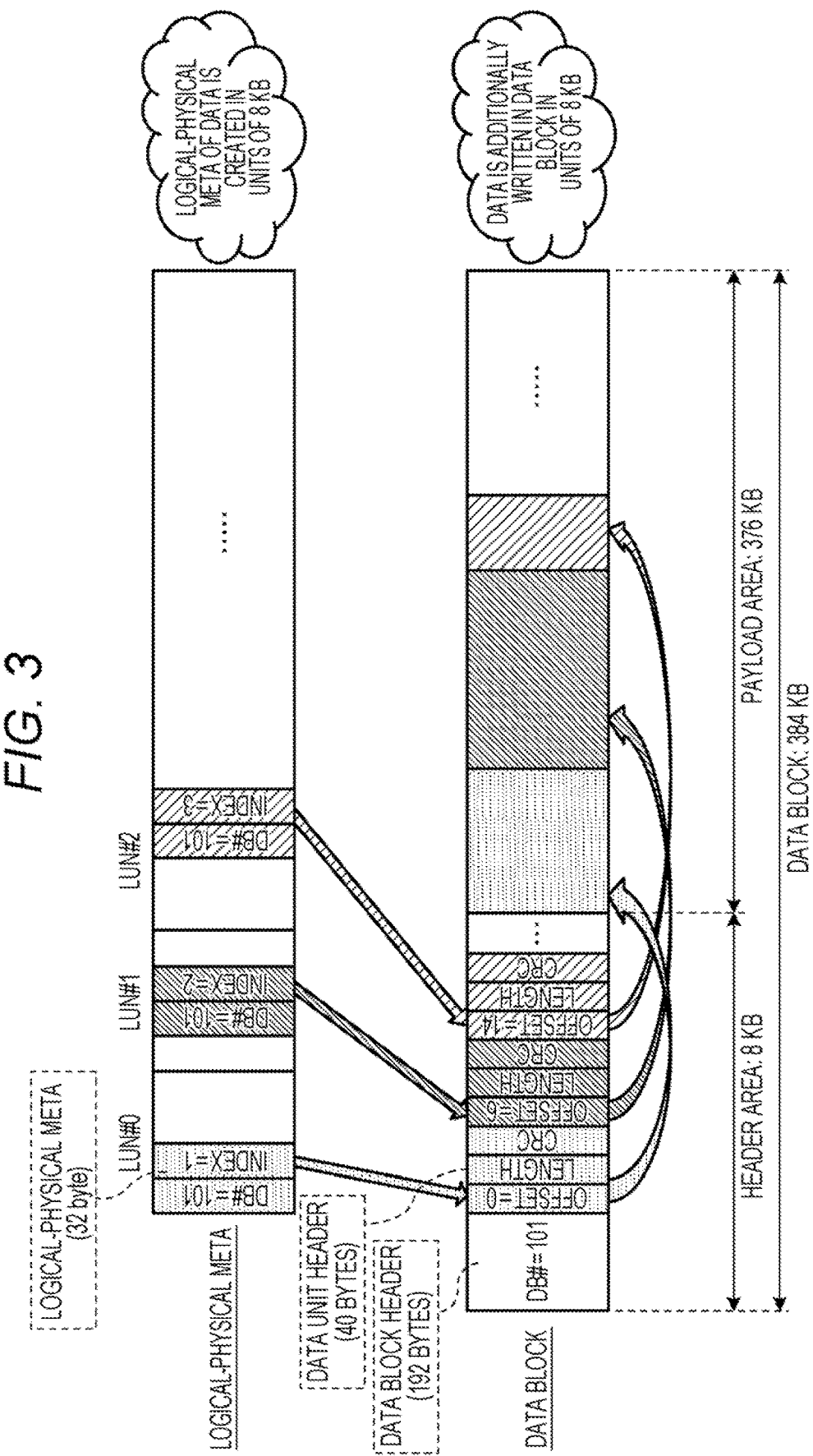
FIG. 3 is a diagram for explaining a data block.

FIG. 3 is a diagram for explaining a data block. In FIG. 3, the data block number (DB #) is "101". As illustrated in FIG. 3, the size of the data block is 384 KB. The data block has a header area of 8 KB and a payload area of 376 KB. The payload area has a data unit that is an area for storing compressed data. The data unit is additionally written in the payload area.

The header area includes a data block header of 192 bytes and 200 or less data unit headers of 40 bytes. The data block header is an area for storing information regarding the data block. The data block header includes information regarding whether or not additional writing of a data unit is possible, the number of data units that are additionally written, and a position where a data unit is to be additionally written next, for example.

The data unit header corresponds to a data unit included in the payload area. The data unit header is at a position corresponding to an index of data stored in a corresponding data unit. The data unit header includes an offset, a length, and a cyclic redundancy check (CRC). The offset indicates a writing start position (head position) in a data block of a corresponding data unit. The length indicates the length of a corresponding data unit. CRC is an error detection code before compression of a corresponding data unit.

In the logical-physical meta in FIG. 2, for example, data having a logical number of "1-1" is stored first in a data block having a data block number of "B1". Here, "1-1" indicates that LUN is 1 and LBA is 1. The same data has the same data block number and the same index due to deduplication. In FIG. 2, pieces of data identified by "1-2", "2-1", and "2-4" are the same as one another. Therefore, "1-2", "2-1", and "2-4" are associated with a data block number "B2" and an index "2".

The data block map is a table for associating a data block number with a physical number. The physical number is a combination of a DG number (DG #) for identifying a drive group (DG) 3c, an RU number (RU #) for identifying a RAID unit (RU), and a slot number (slot #) for identifying a slot. The RAID unit (collective writing unit area) is a collective writing unit area buffered on a main memory in a case where data is written in a storage device, and a plurality of data blocks may be arranged in the RAID unit. Data is collected in units of the RAID unit and additionally written in a storage device. The size of the RAID unit is, for example, 24 megabytes (MB). In the RAID unit, each data block is managed using a slot.

Figure 4:
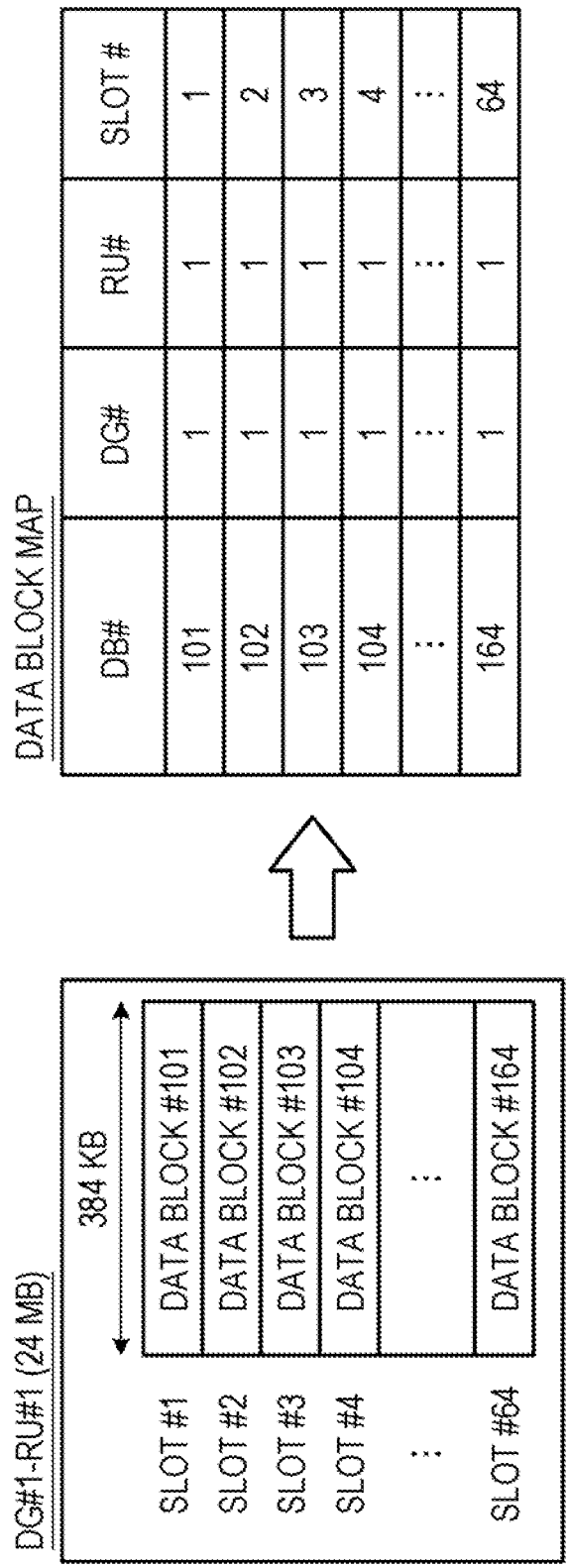
FIG. 4 is a diagram for explaining a data block map.

FIG. 4 is a diagram for explaining a data block map. FIG. 4 illustrates a data block map regarding a RAID unit having a DG number of "1" (DG #1) and an RU number of "1" (RU #1). As illustrated in FIG. 4, the size of the RAID unit is 24 MB, and the size of the data block is 384 KB. Therefore, the number of slots is 64.

FIG. 4 illustrates an example in which a data block is allocated to each slot in ascending order of an address of the data block. Data block #101 is stored in slot #1, data block #102 is stored in slot #2, . . . , and data block #164 is stored in slot #64.

In the data block map of FIG. 2, for example, a data block number "B1" is associated with a physical number "1-1-1". Data of the data block number "B1" is compressed and stored in a slot having a slot number of "1" in a RAID unit having an RU number of "1" in a drive group #1 of the pool 3a. In the pool 3a of FIG. 2, the tier 3b and a slot thereof are omitted.

The reference information associates an index, a physical number, and a reference counter to one another. The reference counter is the number of duplications of data identified by an index and a physical number. In FIG. 2, an index may be included in the physical number.

Figure 5:
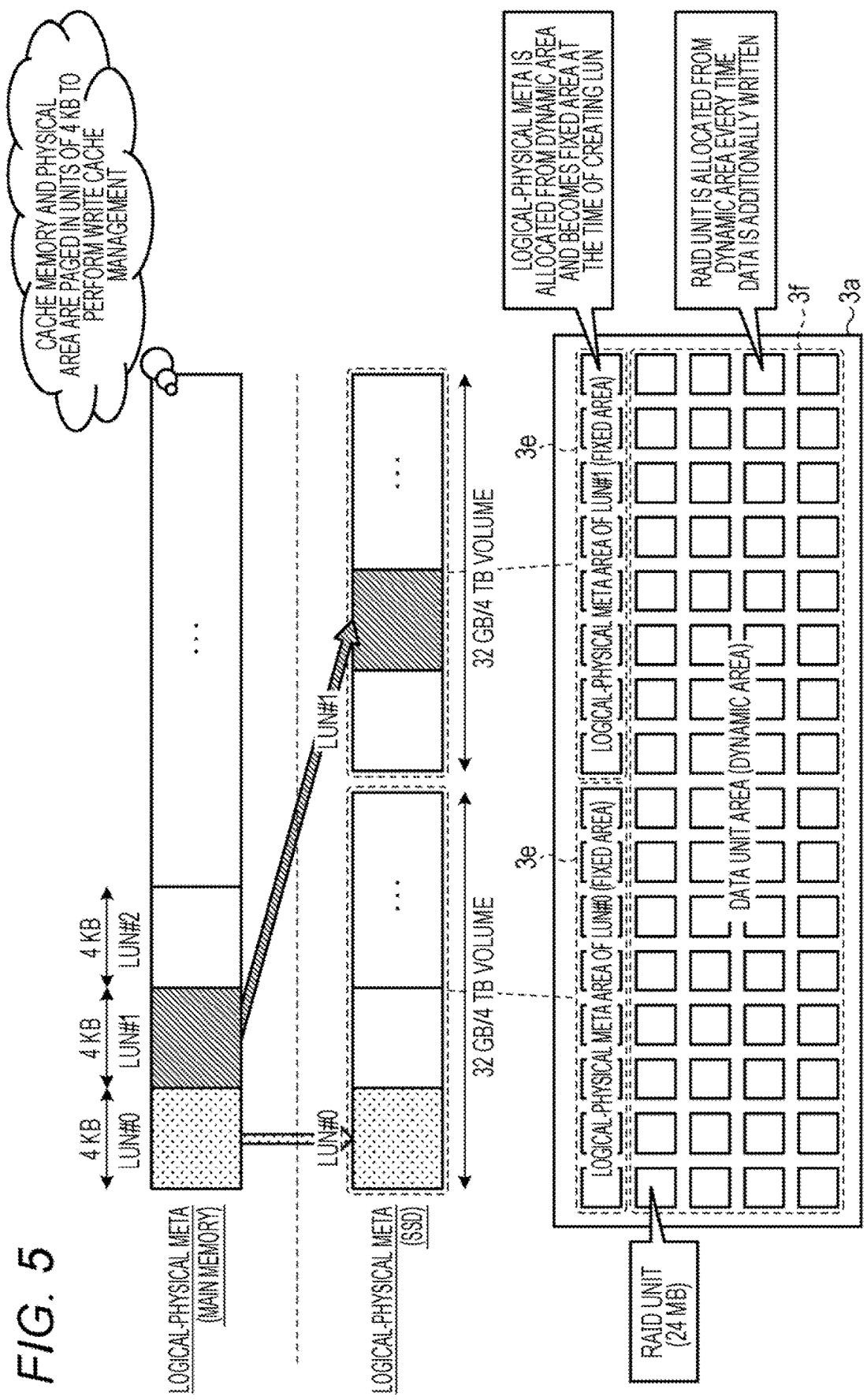
FIG. 5 is a diagram for explaining a physical area.

FIG. 5 is a diagram for explaining a physical area. As illustrated in FIG. 5, the logical-physical meta is stored in both a main memory and a storage. Only a part of the logical-physical meta is stored in the main memory. For the logical-physical meta, only one page (4 KB) is stored for each LUN in the main memory. In a case where a page corresponding to a combination of LUN and LBA is not on the main memory, a page of LUN is paged out, and a page corresponding to the combination of LUN and LBA is read from the storage into the main memory.

In the storage, a logical-physical meta area (area in which a logical-physical meta is stored) 3e of 32 GB is stored for each volume of 4 terabytes (TB). The logical-physical meta area 3e is allocated from a dynamic area and becomes a fixed area at the time of creating LUN. Here, the dynamic area is an area dynamically allocated from the pool 3a. The logical-physical meta area 3e is not subjected to garbage collection (GC). A RAID unit is allocated from a dynamic area when data is additionally written in the storage. Actually, the RAID unit is allocated at the time of additionally writing data in a write buffer that temporarily stores data before writing the data in the storage. A data unit area 3f in which the RAID unit is stored is subjected to GC.

Figure 6:
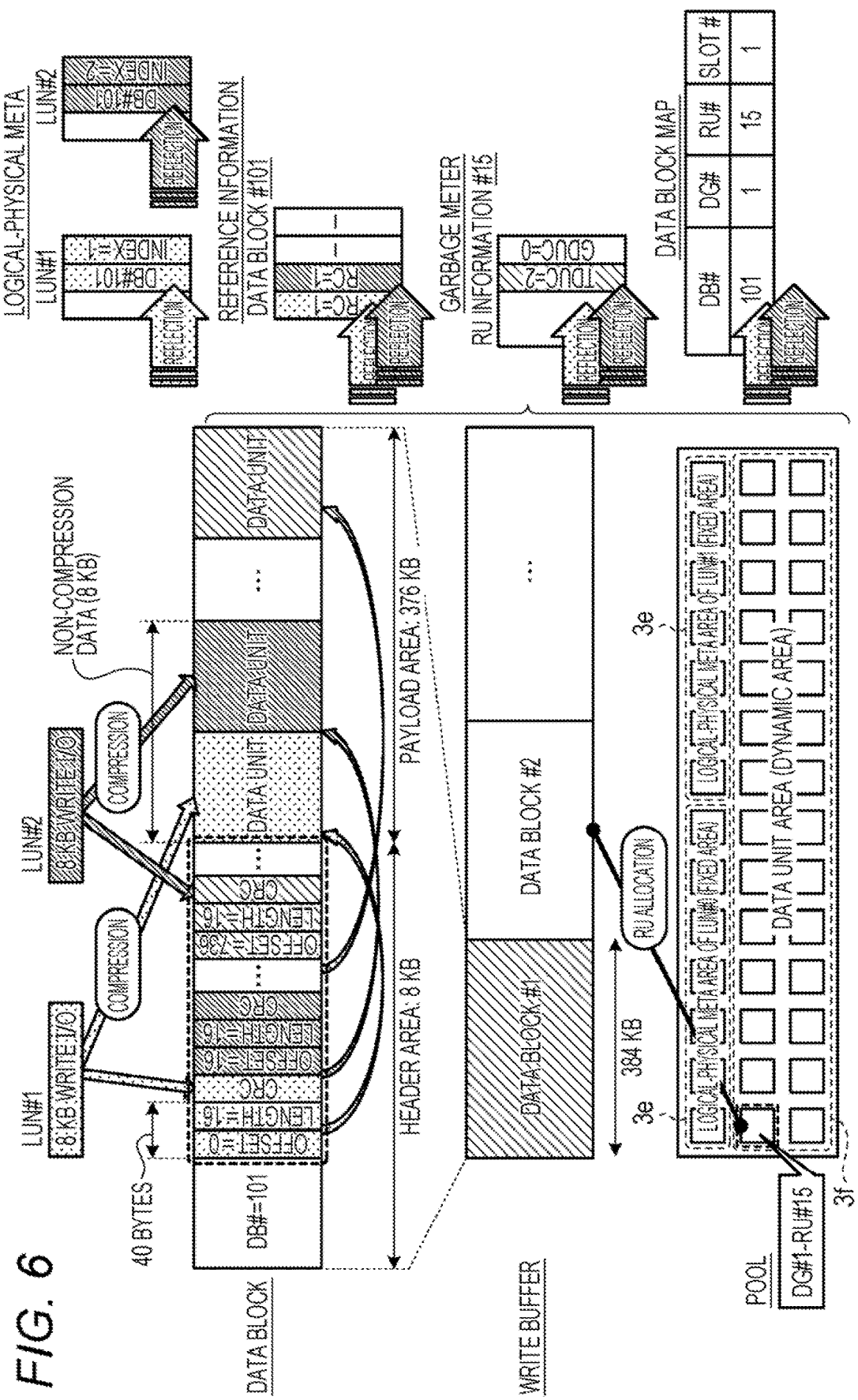
FIG. 6 is a diagram for explaining additional writing of a RAID unit.

FIG. 6 is a diagram for explaining additional writing of a RAID unit. As illustrated in FIG. 6, when 8 KB of write I/O (instruction to write data in a storage) is received in LUN #1, a data unit header is written in a header area of a data block on a write buffer, data is compressed and written in a payload area, and a data block header is updated. Thereafter, when 8 KB of write I/O is received in LUN #2, in the example of FIG. 6, a data unit header is additionally written in a header area of the same data block, the data is compressed and additionally written in the payload area, and a data block header is updated.

Then, in a storage area corresponding to the capacity of the data block secured in the write buffer, when a header area or a payload area in the data block becomes full (there is no available empty area), data is not additionally written in the data block thereafter. Then, when all the data blocks of the RAID unit in the write buffer become full (there is no available empty area), the contents of the write buffer are written in the storage. Thereafter, the storage area of the write buffer allocated to the RAID unit is released. In FIG. 6, the RAID units of DG #1 and RU #15 are allocated from a dynamic area.

The write I/O to LUN #1 is reflected on an area corresponding to LUN #1 of a logical-physical meta, and the write I/O to LUN #2 is reflected on an area corresponding to LUN #2 of the logical-physical meta. A reference count regarding the data of the write I/O is updated, and the write I/O is reflected on the reference information.

A total data unit count (TDUC) and a GC data unit count (GDUC) included in RU information #15 regarding RU #15 are updated, and the write I/O is reflected on a garbage meter. Here, the garbage meter is GC-related information included in RU information. TDUC is the total number of data units in RU and is updated when a data unit is written. GDUC is the number of invalid data units in RU and is updated when a reference counter is updated.

In the data block map, DG #1, RU #15, and slot #1 are associated with DB #101, and the write I/O is reflected on the data block map.

Figure 7:
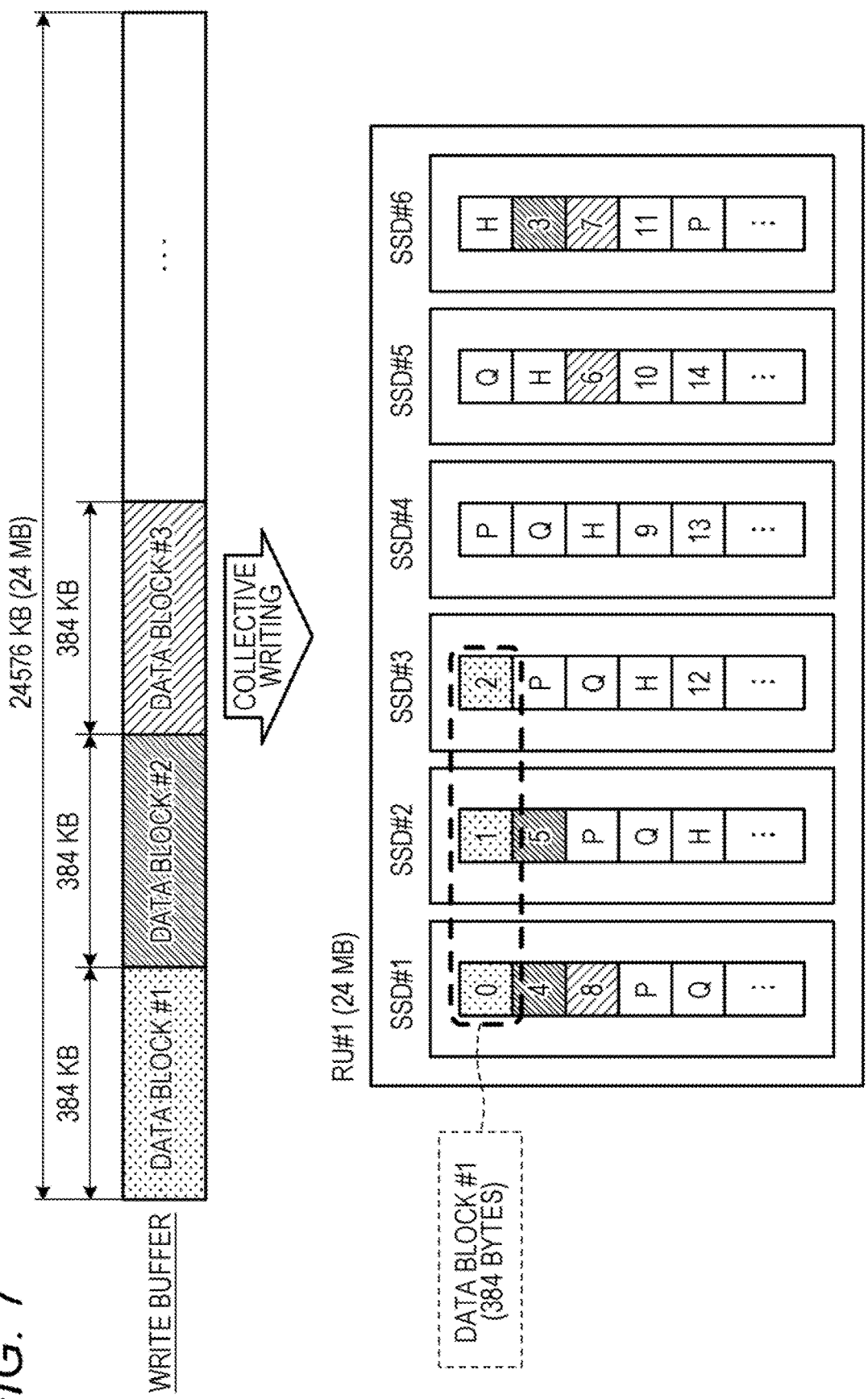
FIG. 7 is a diagram for explaining collective writing of a RAID unit.

FIG. 7 is a diagram for explaining collective writing of a RAID unit. As illustrated in FIG. 7, data blocks are buffered in a write buffer, collected in units of the RAID unit, and written in a storage. For example, data block #1 is written in six SSDs 3d that store one stripe. In FIG. 7, P and Q each represent parity, and H represents hot spare. Data block #1 is written in areas of "0", "1", . . . , and "14" in FIG. 7 for every 128 bytes.

FIG. 8A is a diagram illustrating a format of a logical-physical meta. As illustrated in FIG. 8A, a logical-physical meta of 32 bytes includes a status of 1 byte, a data unit index of 1 byte, a checksum of 2 bytes, a node No. of 2 bytes, and BID of 6 bytes. The logical-physical meta of 32 bytes further includes a data block No. of 8 bytes.

The status indicates the state of a logical-physical meta. There are valid and invalid states. The valid state means that a logical-physical meta has already been allocated to a corresponding LBA. The invalid state means that a logical-physical meta has not been allocated to a corresponding LBA. The data unit index is an index. The checksum is an error code detection value of corresponding data. The Node No. is a number for identifying a storage device (node). The BID is a block ID (position information), that is, LBA. The data block No. is a data block number. The reserved indicates that all bits are 0 for future expansion.

FIG. 8B is a diagram illustrating a format of a data unit header. As illustrated in FIG. 8B, a data unit header of 40 bytes includes a data unit status of 1 byte, a checksum of 2 bytes, and an offset block count of 2 bytes. The data unit header of 40 bytes further includes a compression byte size of 2 bytes and CRC of 32 bytes.

The data unit status indicates whether or not additional writing of a data unit is possible. In a case where there is no data unit corresponding to a data unit header, additional writing is possible. In a case where there is a data unit corresponding to a data unit header, additional writing is impossible. The checksum is an error code detection value of a corresponding data unit.

The offset block count is an offset from the head of a payload area of a corresponding data unit. The offset block count is represented by the number of blocks. However, the block here is not a block of an erasure unit of SSD but a block of 512 bytes. Hereinafter, the block of 512 bytes is referred to as a small block in order to distinguish the block of 512 bytes from the block of an erasure unit of an SSD. The compression byte size is the size of corresponding data after compression. CRC is an error detection code of a corresponding data unit.

FIG. 8C is a diagram illustrating a format of a data block header. As illustrated in FIG. 8C, a data block header of 192 bytes includes a data block full flag of 1 byte and a write data unit count of 1 byte. The data block header of 192 bytes includes a next data unit header index of 1 byte, a next write block offset of 8 bytes, and a data block No. of 8 bytes.

The data block full flag is a flag indicating whether or not additional writing of a data unit is possible. In a case where a remaining writing capacity of a data block is a threshold value or more and there is sufficient empty capacity for additionally writing a data unit, additional writing of the data unit is possible. Meanwhile, in a case where a remaining writing capacity of a data block is less than a threshold value and there is not sufficient empty capacity for additionally writing a data unit, additional writing of the data unit is impossible.

The write data unit count is the number of data units that have been additionally written in a data block. The next data unit header index is an index of a data unit header to be written next. The next write block offset is an offset position from the head of a payload area of a data unit to be written next.

The unit is the number of small blocks. The data block No. is a data block number allocated to a slot.

Figure 9:
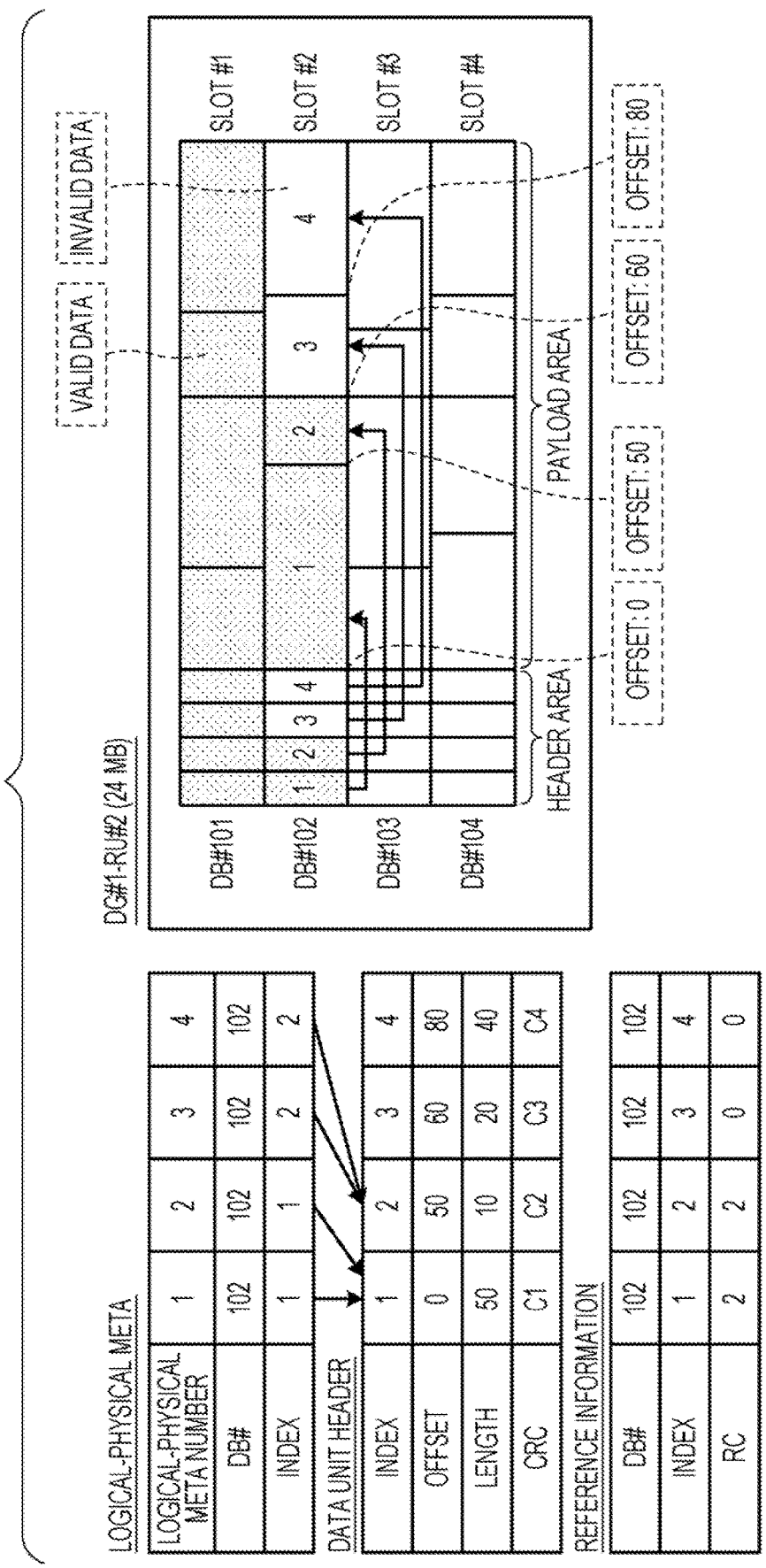
FIG. 9 is a diagram illustrating a relationship among a logical-physical meta, a data unit header, and reference information.

FIGS. 9, 10A, and 10B are diagrams for explaining characteristics of a metadata system according an embodiment. FIG. 9 is a diagram illustrating a relationship among a logical-physical meta, a data unit header, and reference information. As illustrated in FIG. 9, in the metadata system according to an embodiment, a logical-physical meta, a data unit header, and reference information are used. A storage position of a data unit header is specified by a DB # of the logical-physical meta and the index. The position of a data unit in a data block is specified from the offset of the data unit header and the length.

In a case where a plurality of pieces of the same data is stored in the logical-physical meta, the plurality of pieces of the same data is collected into one by a deduplication function, and the number of duplications is counted as a reference counter (RC). In FIG. 9, data of each of indexes "1" and "2" of DB #102 stored in RU #2 of DG #1 is referred to from two positions. At this time, the reference counter of each of the indexes "1" and "2" is "2". The data of the indexes "1" and "2" is valid data. The data of indexes "3" and "4" is invalid data because of having a reference counter of "0".

FIGS. 10A and 10B are diagrams for explaining improvement in capacity efficiency. FIGS. 10A and 10B illustrate a case where 8 KB of data is written without being compressed. Data designated by LUN/LBA is written in a data unit in units of a small block. For this reason, FIG. 10A illustrates a case where non-compression data and CRC are packed in a payload area and 16 small blocks are packed in a data unit. A data unit header does not include CRC, and therefore has a size of 32 bytes. The entire data block has a storage capacity of 384 KB, a header area of 2 KB, and a payload area of 382 KB.

In this case, a use capacity of the payload area in a case of non-compression is 512 bytes×16 small blocks designated by LUN/LBA+CRC 32 bytes=8224 bytes. However, a command for SSD is designated by an integer multiple of 1 or more of 512 bytes. Therefore, a command for reading out 8224 bytes is 512 bytes×17 small blocks=8704 bytes. A payload area of one data unit is set to 8704 bytes at a maximum. That is, for example, the storage area of 8704−8224=480 bytes is not used and is wasted. As the number of non-compression data units increases, the storage area of an integer multiple of 480 bytes is wasted.

Meanwhile, as illustrated in FIG. 10B, if CRC is included in a data unit header, data of 512 bytes×16 small blocks=8192 bytes is arranged in a payload area. That is, for example, a payload area of one data unit may be set to 8192 bytes at a maximum. Therefore, the above-described waste of 480 bytes may be avoided. In addition, unnecessary writing of the 17th small block may be reduced, which may contribute to an effect of reducing the number of times of writing. Since 384 KB of the storage capacity of the entire data block is fixed, a header area is 8 KB, and a payload area is 376 KB. Therefore, the metadata system according to an embodiment may make full use of the payload area even in a case of non-compression. In addition, non-compression data and compressed data may be efficiently packed.

Figure 11:
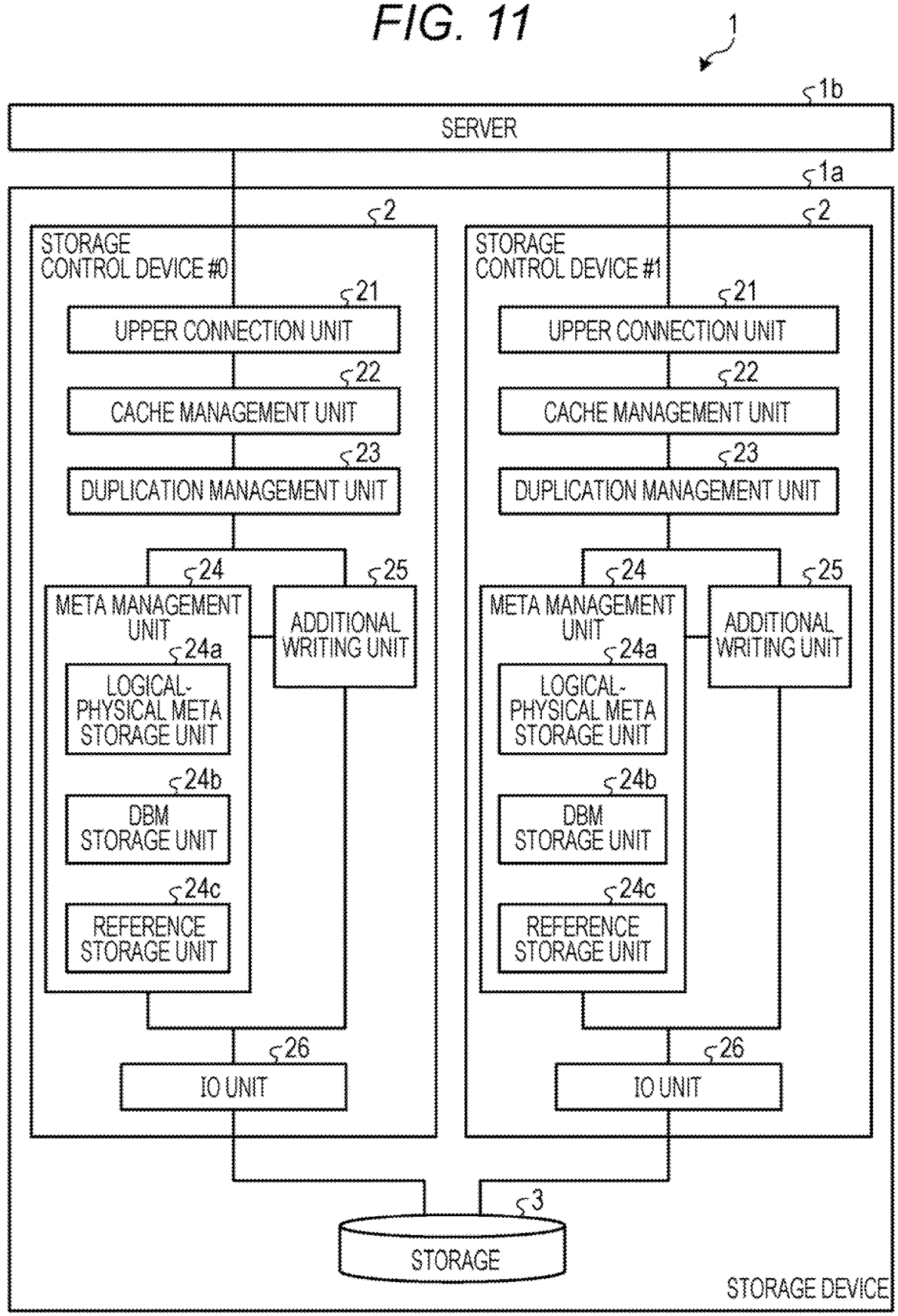
FIG. 11 is a diagram illustrating a configuration of an information processing system according to an embodiment.

Next, a configuration of an information processing system according to an embodiment will be described. FIG. 11 is a diagram illustrating a configuration of an information processing system according to an embodiment. As illustrated in FIG. 11, an information processing system 1 according to an embodiment includes a storage device 1a and a server 1b. The storage device 1a stores data used by the server 1b. The server 1b is an information processing device that performs processing such as information processing. The storage device 1a and the server 1b are connected to each other by a fibre channel (FC) and an Internet small computer system interface (iSCSI).

The storage device 1a includes a storage control device 2 that controls the storage device 1a and a storage (storage device) 3 that stores data. Here, the storage 3 is a set of a plurality of SSDs 3d.

In FIG. 11, the storage device 1a includes two storage control devices 2 represented by a storage control device #0 and a storage control device #1. However, the storage device 1a may include three or more storage control devices 2. In FIG. 11, the information processing system 1 includes one server 1b. However, the information processing system 1 may include two or more servers 1b.

The storage control device 2 shares and manages the storage 3 and is in charge of one or more pools 3a. The storage control device 2 includes an upper connection unit 21, a cache management unit 22, a duplication management unit 23, a meta management unit 24, an additional writing unit 25, and an IO unit 26.

The upper connection unit 21 exchanges information between each of an FC driver and an iSCSI driver and the cache management unit 22. The cache management unit 22 manages data on a cache memory. The duplication management unit 23 manages unique data stored in the storage device 1a by controlling data deduplication/restoration.

The meta management unit 24 manages a logical-physical meta, a data block map, and a reference count. In addition, the meta management unit 24 converts a logical address used for identifying data in a virtual volume and a physical address indicating a position at which data in an SSD 3d is stored using the logical-physical meta and the data block map. Here, the physical address is a combination of a data block number and an index.

The meta management unit 24 includes a logical-physical meta storage unit 24a, a DBM storage unit 24b, and a reference storage unit 24c. The logical-physical meta storage unit 24a stores a logical-physical meta. The DBM storage unit 24b stores a data block map. The reference storage unit 24c stores reference information.

The additional writing unit 25 manages data with continuous data units, and writes the data additionally and collectively in an SSD 3d in units of a RAID unit. The additional writing unit 25 compresses and decompresses data. The additional writing unit 25 accumulates write data in a write buffer that is a buffer on a main memory and judges whether or not an empty area of the write buffer has become a certain threshold value or less every time the write data is written in the write buffer. Then, the additional writing unit 25 writes the write buffer in the SSD 3d when the empty area of the write buffer becomes a certain threshold value or less. The additional writing unit 25 manages a physical space of the pool 3a and arranges the RAID units. The IO unit 26 writes the RAID units in the storage 3.

The upper connection unit 21 controls data deduplication/restoration, and the additional writing unit 25 compresses and decompresses data. The storage control device 2 may thereby reduce write data and may further reduce the number of times of writing.

Figure 12:
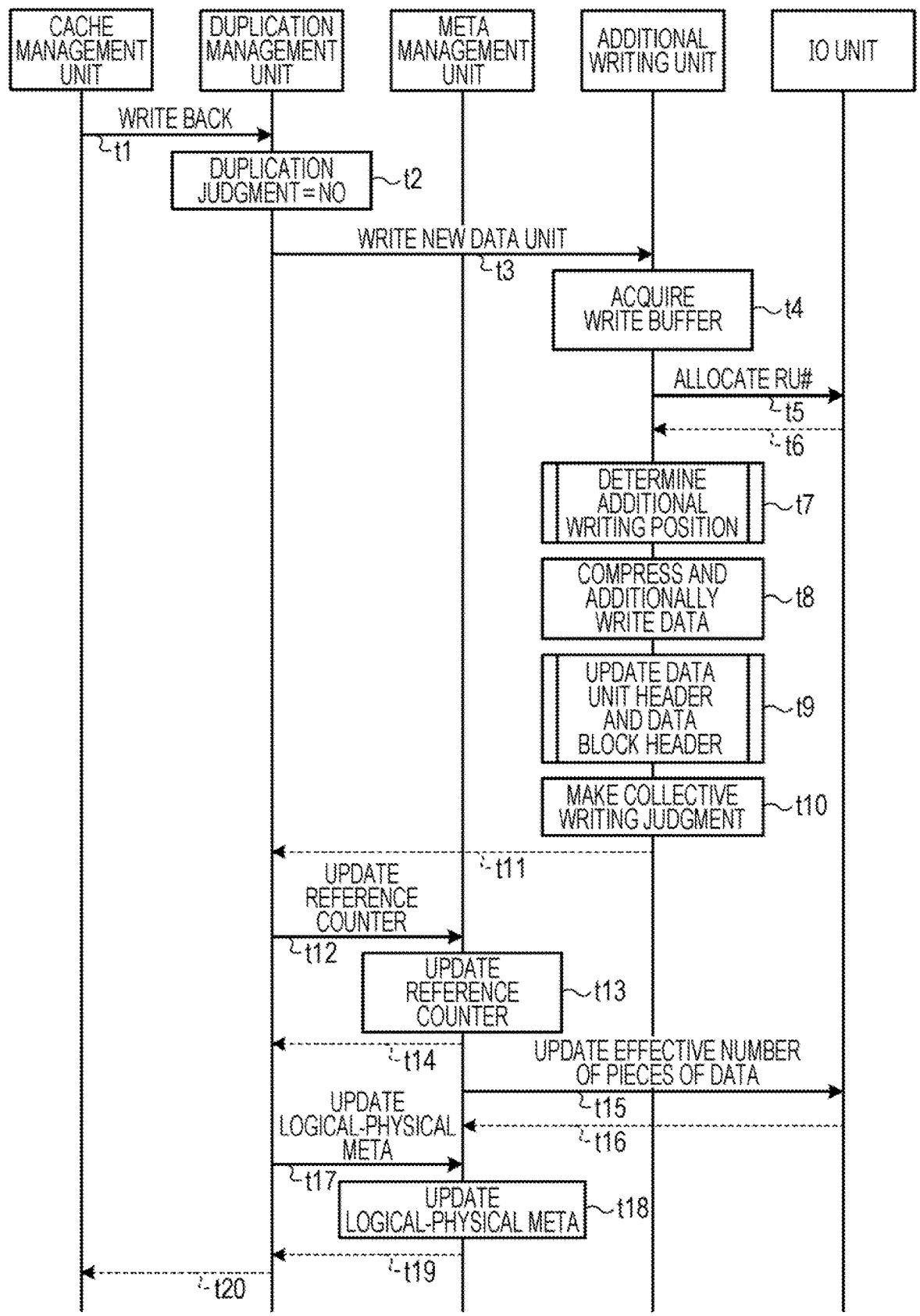
FIG. 12 is a diagram illustrating a sequence of processing of writing data without duplication.
Figure 15:
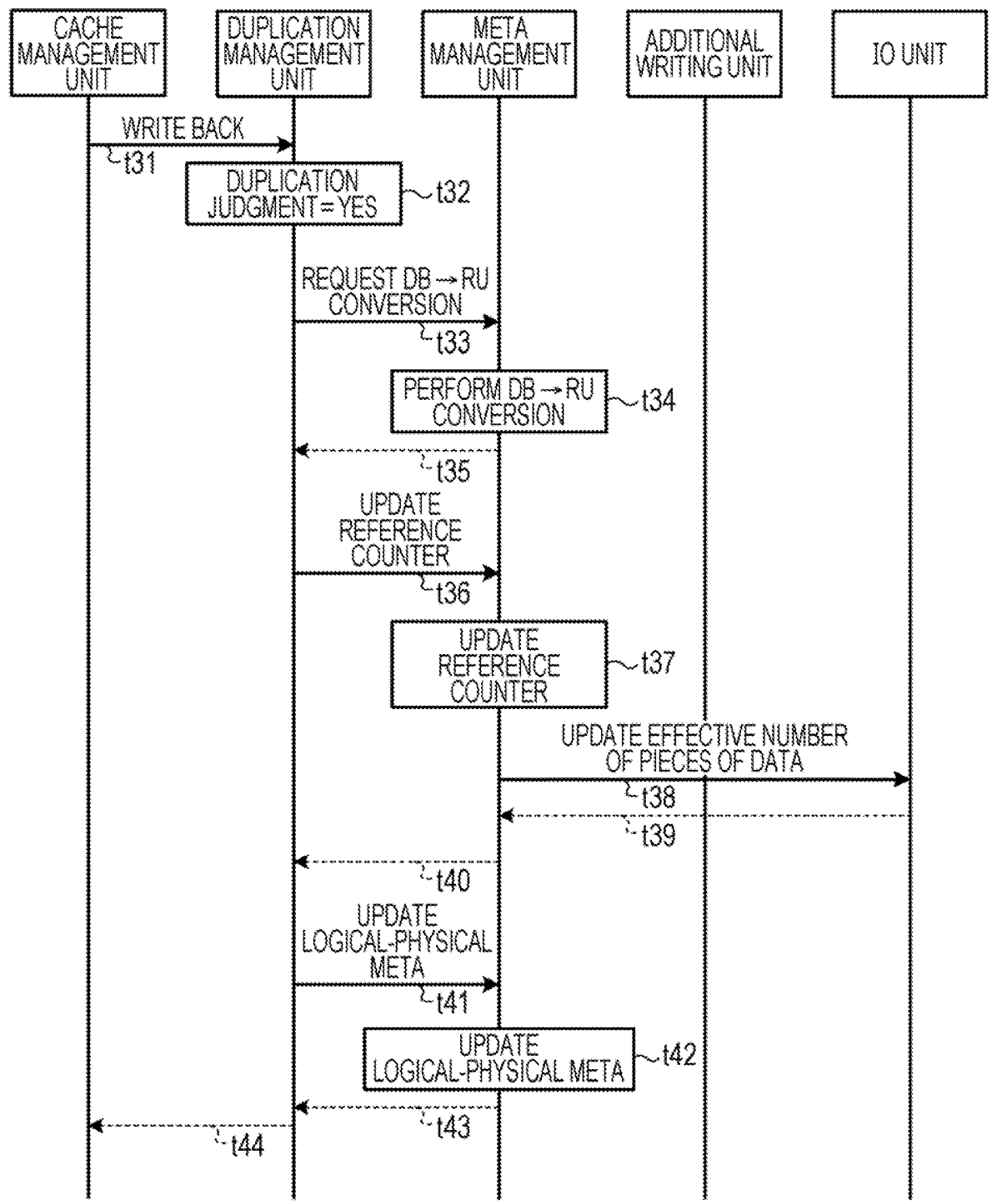
FIG. 15 is a diagram illustrating a sequence of processing of writing data with duplication.

Next, a sequence of writing processing will be described. FIG. 12 is a diagram illustrating a sequence of processing of writing data without duplication. FIG. 15 is a diagram illustrating a sequence of processing of writing data with duplication.

In the processing of writing data without duplication, as illustrated in FIG. 12, the cache management unit 22 requests the duplication management unit 23 to write back data (t1). Then, the duplication management unit 23 makes a duplication judgement of data and there is no duplication (t2). Therefore, the duplication management unit 23 requests the additional writing unit 25 to write a new data unit (t3).

Then, the additional writing unit 25 acquires a write buffer (t4) and requests the IO unit 26 to allocate a RU # when the RU # is not allocated to the write buffer (t5). Then, the additional writing unit 25 receives the RU # allocated by the IO unit 26 (t6). When the RU # is allocated to the write buffer, the processing of t5 and t6 is omitted.

Then, the additional writing unit 25 determines an additional writing position (t7), compresses data, and additionally writes the data (t8). Then, the additional writing unit 25 updates a data unit header and a data block header (t9), and makes a collective writing judgement (t10). Then, when the additional writing unit 25 judges that the write buffer is full and collective writing is desirable, the additional writing unit 25 requests the IO unit 26 to collectively write the write buffer. Then, the additional writing unit 25 sends a response of completion to the duplication management unit 23 (t11).

Then, the duplication management unit 23 requests the meta management unit 24 to update a reference counter (t12), and the meta management unit 24 updates the reference counter (t13). Specifically, for example, the meta management unit 24 increments the reference counter of written data. When the data is overwritten, the meta management unit 24 decrements the reference counter of the data before overwriting.

Then, the meta management unit 24 sends a response of update completion to the duplication management unit 23 (t14), and requests the IO unit 26 to update the effective number of pieces of data (t15). Here, the effective number of pieces of data refers to TDLC and GDLC. The IO unit 26 increments TDLC of written data. In a case where the data is overwritten, when RC of the data before overwriting becomes 0, the IO unit 26 decrements GLDC of RU in which the data before overwriting was stored. Then, the IO unit 26 sends a response of update completion of the effective number of pieces of data to the meta management unit 24 (t16).

Then, the duplication management unit 23 requests the meta management unit 24 to update a logical-physical meta (t17). Then, the meta management unit 24 updates the logical-physical meta (t18), and sends a response of update completion to the duplication management unit 23 (t19). Then, the duplication management unit 23 sends a response of completion of write back to the cache management unit 22 (t20). The cache management unit 22 releases the write buffer.

In this manner, the additional writing unit 25 determines an additional writing position, compresses and additionally writes data in a data block, and updates a data unit header and a data block header. As a result, data without duplication may be written in the storage 3. Switching of compression/non-compression of data is possible, and may be selectively set in the additional writing unit 25.

Figure 13:
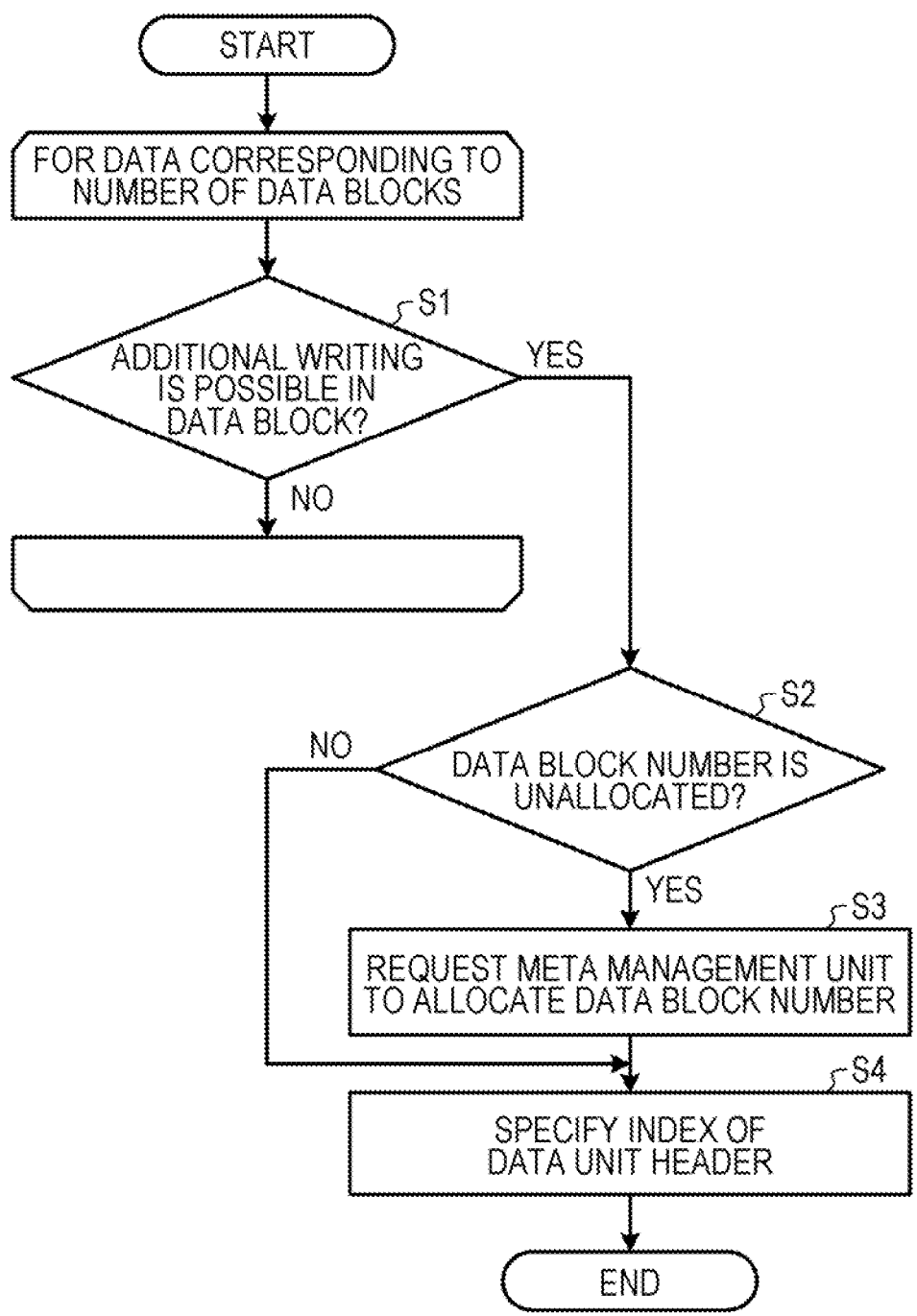
FIG. 13 is a flowchart illustrating a flow of processing for determining an additional writing position.

FIG. 13 is a flowchart illustrating a flow of processing for determining an additional writing position. The processing illustrated in FIG. 13 corresponds to the processing of t7 in FIG. 12. As illustrated in FIG. 13, the additional writing unit 25 judges whether or not additional writing is possible in a data block sequentially from a data block at the head of to write buffer (step S1). The additional writing unit 25 checks a data block full flag of a data block header to judge whether or not additional writing is possible in a data block. When additional writing is impossible in a write buffer, a new write buffer is prepared. Therefore, a data block in which additional writing is possible may be found in a write buffer.

Then, when a data block in which additional writing is possible is found, the additional writing unit 25 judges whether or not a data block number is unallocated (step S2). If the data block number is unallocated, the additional writing unit 25 requests the meta management unit 24 to allocate a data block number (step S3). The meta management unit 24 allocates a data block number and associates a physical number and the data block number to each other in a data block map.

Then, the additional writing unit 25 specifies an index of a data unit header using a next data unit header index (step S4), and determines the data block number and the index of the data unit header as an additional writing position.

In this manner, the additional writing unit 25 may determine an additional writing position of data using a data block header and a data unit header.

Figure 14:
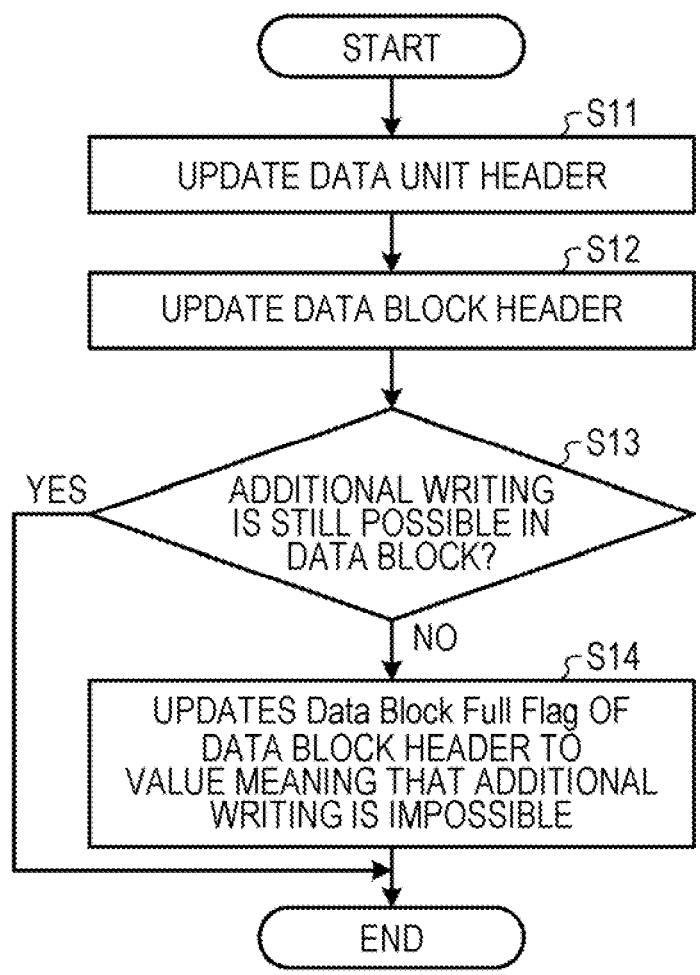
FIG. 14 is a flowchart illustrating a flow of processing of updating a data unit header and a data block header.

FIG. 14 is a flowchart illustrating a flow of processing of updating a data unit header and a data block header. The processing illustrated in FIG. 14 corresponds to the processing of t9 in FIG. 12. As illustrated in FIG. 14, the additional writing unit 25 updates a data unit header corresponding to written data (step S11). Specifically, for example, the additional writing unit 25 updates a data unit status such that additional writing is impossible.

Then, the additional writing unit 25 updates a data block header of a data block in which data is written (step S12). Specifically, for example, the additional writing unit 25 updates a write data unit count, a next data unit header index, and a next write block offset.

Then, the additional writing unit 25 judges whether or not additional writing is still possible in the data block (step S13). The additional writing unit 25 judges whether or not additional writing is possible based on whether or not a next write block offset is a threshold value or less. The size of a payload area is 376 KB, and an empty area of 8 KB may be desirable for additional writing in a case of non-compression. Therefore, if 376 KB−8 KB=368 KB≈736 small blocks (736×512 bytes) and a next write block offset>736 are satisfied, additional writing is impossible.

Then, if additional writing in the data block is impossible, the additional writing unit 25 updates a data block full flag of a data block header to a value meaning that additional writing is impossible (step S14).

In this manner, by updating a data unit header and a data block header when writing data, the additional writing unit 25 may determine an additional writing position of data using the data block header and the data unit header when writing data next.

In processing of writing data with duplication, as illustrated in FIG. 15, the cache management unit 22 requests the duplication management unit 23 to write back data (t31). Then, the duplication management unit 23 makes a duplication judgement of data and there is duplication (t32). Therefore, the duplication management unit 23 specifies the number of a data block for storing the data and an index thereof and requests the meta management unit 24 to perform DB→RU conversion (t33). Here, DB→RU conversion is to convert the data block number to a physical number.

Then, the meta management unit 24 performs DB RU conversion (t34) and sends a response of the physical number to the duplication management unit 23 (t35). Then, the duplication management unit 23 requests the meta management unit 24 to update a reference counter corresponding to the physical number and the index (t36), and the meta management unit 24 updates the reference counter (t37).

Then, the meta management unit 24 requests the IO unit 26 to update the effective number of pieces of data (t38). Then, the IO unit 26 updates the effective number of pieces of data, and sends a response of update completion of the effective number of pieces of data to the meta management unit 24 (t39). Then, the meta management unit 24 sends a response of update completion of the reference counter to the duplication management unit 23 (t40).

Then, the duplication management unit 23 requests the meta management unit 24 to update a logical-physical meta (t41). Then, the meta management unit 24 updates the logical-physical meta (t42) and sends a response of update completion to the duplication management unit 23 (t43). Then, the duplication management unit 23 sends a response of completion of write back to the cache management unit 22 (t44).

In this manner, the duplication management unit 23 may perform processing of writing data with duplication by requesting the meta management unit 24 to update a reference counter and to update a logical-physical meta.

Figure 16:
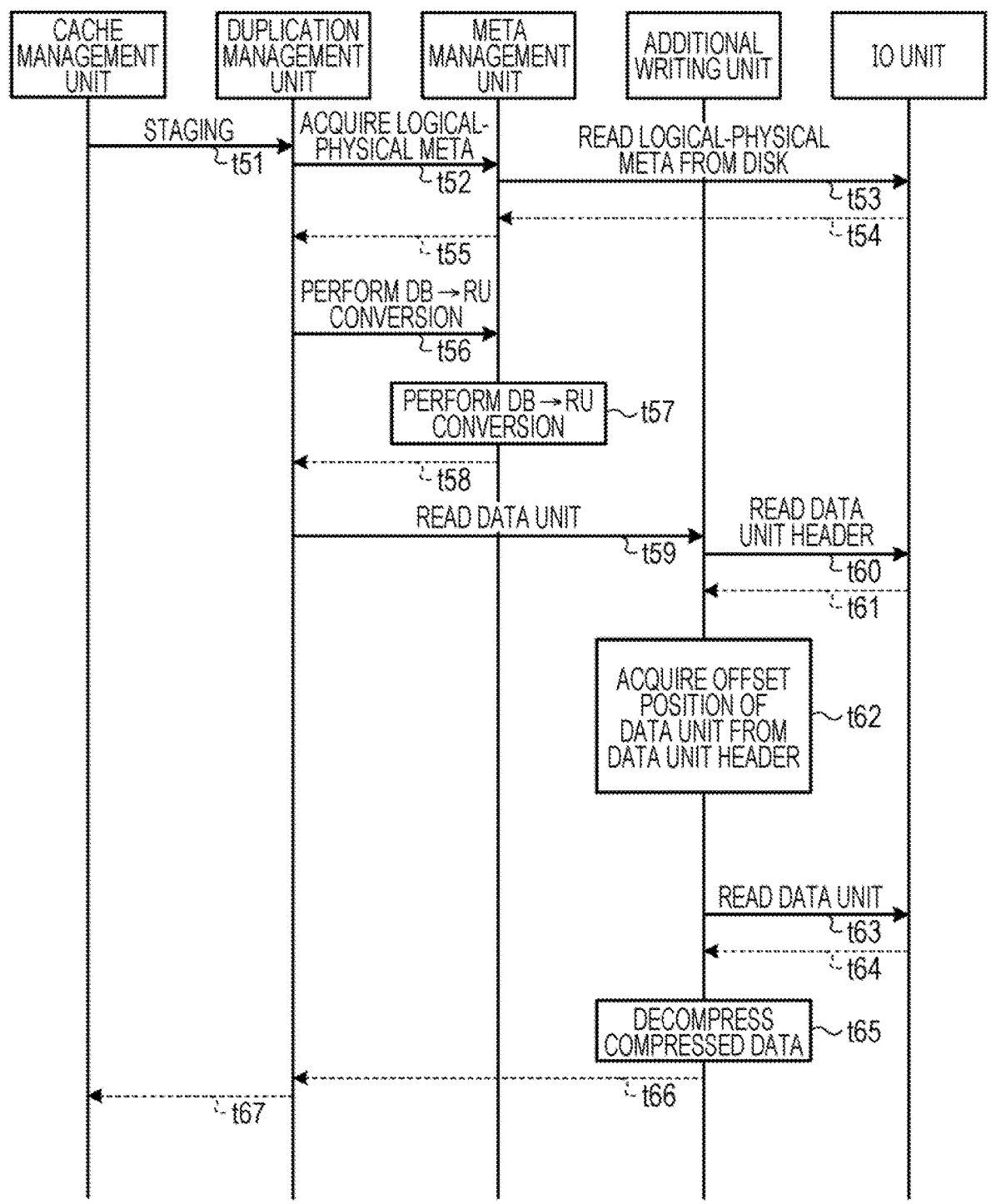
FIG. 16 is a diagram illustrating a sequence of reading processing.

Next, a sequence of reading processing will be described. FIG. 16 is a diagram illustrating a sequence of reading processing. As illustrated in FIG. 16, the cache management unit 22 requests the duplication management unit 23 to perform staging of data using a logical address (t51). Then, the duplication management unit 23 requests the meta management unit 24 to acquire a logical-physical meta corresponding to the logical address (t52).

Then, the meta management unit 24 requests the IO unit 26 to read the logical-physical meta (t53). If a corresponding logical-physical meta is not on a cache, a page specified by LUN and LBA on the cache is paged out, and a page corresponding to the corresponding logical-physical meta is paged in. Then, the IO unit 26 sends a response of the read logical-physical meta to the meta management unit 24 (t54). The meta management unit 24 sends a response of the acquired logical-meta meta to the duplication management unit 23 (t55).

Then, the duplication management unit 23 requests the meta management unit 24 to perform DB→RU conversion for a data block number included in the acquired logical-physical meta (t56). The meta management unit 24 performs DB→RU conversion (t57) and sends a response of the physical number to the duplication management unit 23 (t58). Then, the duplication management unit 23 requests the additional writing unit 25 to read a data unit using the sent physical number and an index included in the logical-physical meta (t59).

Then, the additional writing unit 25 requests the IO unit 26 to read a data unit header corresponding to the requested data unit (t60), and receives the data unit header from the IO unit 26 (t61). Then, the additional writing unit 25 acquires an offset position of a data unit from the received data unit header (t62) and requests the IO unit 26 to read a data unit at the acquired offset position (t63).

Then, the additional writing unit 25 receives the data unit from the IO unit 26 (t64) and decompresses the compressed data (t65). Then, the additional writing unit 25 sends a response of the decompressed data to the duplication management unit 23 (t66). The duplication management unit 23 receives the data and sends a response of the data to the cache management unit 22 (t67).

In this manner, the duplication management unit 23 acquires a logical-physical meta corresponding to a logical address, converts a data block number included in the acquired logical-physical meta to a physical number, designates the physical number and an index included in the acquired logical-physical meta, and requests the additional writing unit 25 to read a data unit. Therefore, the duplication management unit 23 may read out data requested by the cache management unit 22 from the storage 3.

As described above, in an embodiment, the logical-physical meta storage unit 24a stores a logical-physical meta that associates a logical address of data with a data block number for storing the data and an index indicating the position of the data in a data block. The DBM storage unit 24b stores a data block map that associates a data block number with a physical number indicating the storage position of a data block in the storage 3. The data block has a header area for storing a data unit header including an offset indicating a position in a data block and a data length for each piece of data to be stored at a position designated by an index, and a payload area for storing data. Therefore, by additionally writing data in the payload area using the logical-physical meta storage unit 24a, the DBM storage unit 24b, and the header area, the storage control device 2 may reduce the number of times of writing in the storage 3.

In an embodiment, data is stored with the size of an integer multiple of a unit length for reading and writing the storage 3 as a unit, and CRC of data is stored in a data unit header. Therefore, in a case where data is not compressed, a payload area may be used effectively.

In an embodiment, the reference storage unit 24c stores a reference counter indicating the number of duplications of data in association with a physical number and an index. Therefore, the storage control device 2 may perform deduplication.

In an embodiment, a data block header including the number of pieces of data to be stored in a data block, an index of data to be written next, and an offset of the data to be written next is stored in a header area. Therefore, the storage control device 2 may efficiently write data in a payload area.

In an embodiment, the storage control device 2 uses the number of a drive group 3c, the number of a RAID unit number, and the number of a slot as physical numbers, and therefore may uniquely specify the storage position of a data block in the storage 3.

In an embodiment, the additional writing unit 25 cooperates with the meta management unit 24 and the IO unit 26 to additionally and collectively write data in the storage 3. Therefore, the number of times of writing in the storage 3 may be reduced.

The storage control device 2 has been described in an embodiment. However, a storage control program having a similar function may be obtained by achieving the configuration of the storage control device 2 with software. Therefore, a hardware configuration of the storage control device 2 that executes the storage control program will be described.

Figure 17:
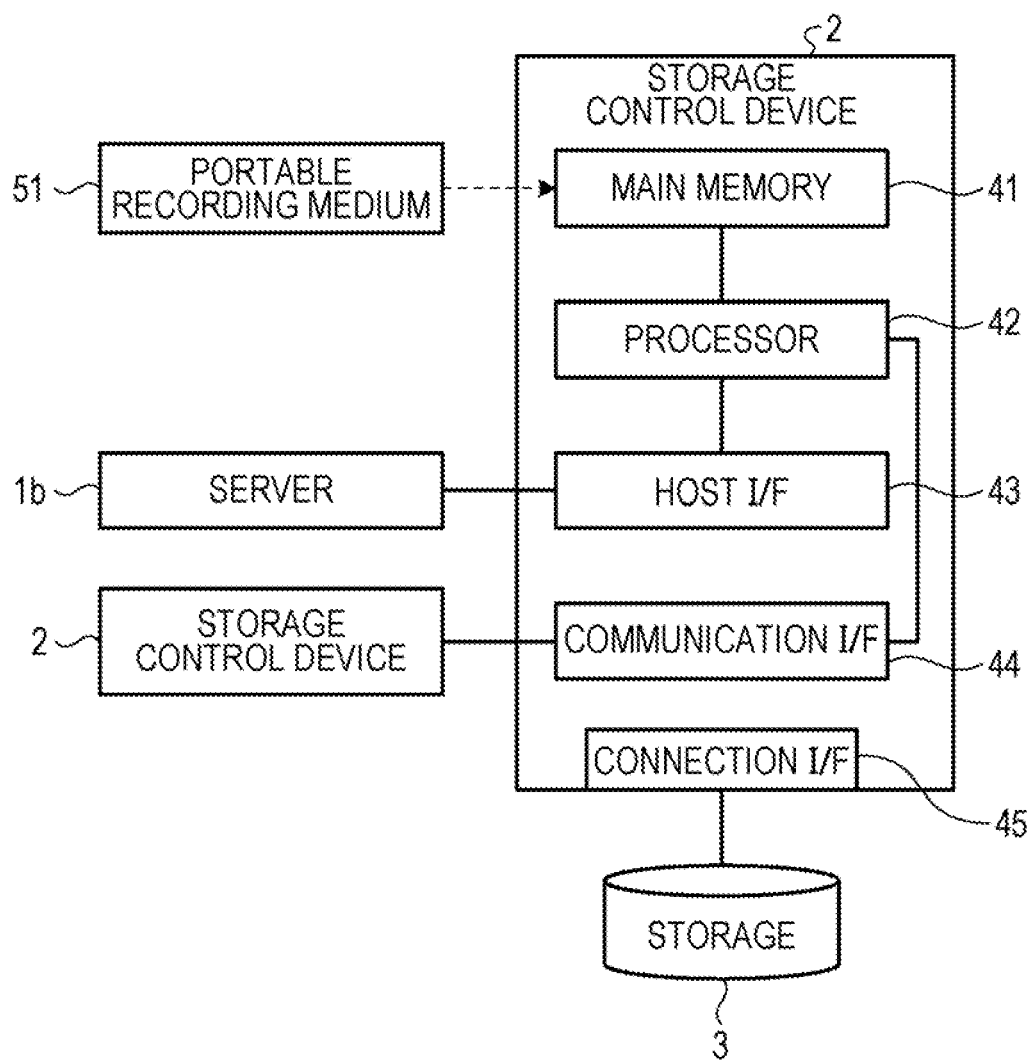
FIG. 17 is a diagram illustrating a hardware configuration of a storage control device that executes a storage control program according to an embodiment.

FIG. 17 is a diagram illustrating the hardware configuration of the storage control device 2 that executes a storage control program according to an embodiment. As illustrated in FIG. 17, the storage control device 2 includes a main memory 41, a processor 42, a host I/F 43, a communication I/F 44, and a connection I/F 45.

The main memory 41 is a random access memory (RAM) that stores a program, an intermediate result of executing a program, and the like. The processor 42 is a processing device that reads out a program from the main memory 41 and executes the program.

The host I/F 43 is an interface with the server 1b. The communication I/F 44 is an interface for communicating with another storage control device 2. The connection I/F 45 is an interface with the storage 3.

A storage control program executed in the processor 42 is stored in a portable recording medium 51 and read into the main memory 41. Alternatively, the storage control program is stored in a database or the like of a computer system connected via the communication I/F 44, read out from the database, and read into the main memory 41.

In an embodiment, the case where the SSD 3d is used as a nonvolatile storage medium has been described. However, the embodiment is not limited thereto, and may also be applied to a case where another nonvolatile storage medium having a limitation on the number of times of writing like the SSD 3d is used.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control device, comprising:
a memory configured to store meta information and map information, wherein the meta information associates a logical address to identify data from an information processing device which uses a storage with a data block identifier to identify a data block which is used for an arrangement of the data on the storage and includes a header area with a capacity to store header information related to data corresponding to a plurality of indexes and a payload area with a capacity to store data corresponding to the plurality of indexes and an index indicating an order of additional writing of the data in the data block, wherein the map information associates the data block identifier with a physical identifier indicating a physical position on the storage for the data block; and
a processor configured to:
specify the data block and a write position in a payload area of the data block based on the physical identifier of the data block and the index;
write the data in the specified data block; and
perform a write control to write a data unit header including an offset area to which an offset indicating the write position in the data block is written and a data length area to which a data length indicating a length of the data is written at a position which is designated by the index in the header area.

2. The storage control device according to claim 1, wherein the processor is configured to:
write the data in a corresponding data block on a buffer; and
judge whether or not there is no available empty area in a collective writing unit area corresponding to a capacity in which a plurality of data blocks is arranged on the buffer for each writing; and perform collective writing in the storage according to a result of a judgement.

3. The storage control device according to claim 1, wherein the write control includes a control to write a code to detect an error of the data in the data unit header.

4. The storage control device according to claim 1, wherein the write control includes a control to write a data block header including a number of pieces of data to be stored in the data block, an index of data to be written next, and an offset of the data to be written next in the header area.

5. The storage control device according to claim 1, wherein the physical identifier includes:
a DG identifier that identifies a drive group obtained by grouping a plurality of storage media;
an RU identifier that identifies a collective writing unit area that is a unit for collectively writing the data blocks in the storage; and
a slot identifier that identifies a slot that stores the data block in the collective writing unit area.

6. The storage control device according to claim 1, wherein the processor is configured to:
set, when there is a duplication of data, a data block identifier and an index in the meta information to be the same as a data block identifier and an index in a reference; and
store reference information which associates a reference count indicating a number of duplications of the data with the data in the memory, and compress, when there is no duplication of data, data.

7. The storage control device according to claim 1, wherein the storage uses a storage medium having a limitation on a number of times of writing.

8. A storage control method comprising:
storing, in a memory, meta information which associates a logical address to identify data from an information processing device which uses a storage with a data block identifier to identify a data block which is used for an arrangement of the data on the storage and includes a header area with a capacity to store header information related to data corresponding to a plurality of indexes and a payload area with a capacity to store data corresponding to the plurality of indexes and an index indicating an order of additional writing of the data in the data block;
storing, in the memory, map information which associates the data block identifier with a physical identifier indicating a physical position on the storage for the data block; specifying the data block and a write position in a payload area of the data block based on the physical identifier of the data block and the index;
writing the data in the specified data block; and
performing a write control to write a data unit header including an offset area to which an offset indicating the write position in the data block is written and a data length area to which a data length indicating a length of the data is written at a position which is designated by the index in the header area.

9. The storage control method according to claim 8, further comprising:
writing the data in a corresponding data block on a buffer; and
judging whether or not there is no available empty area in a collective writing unit area corresponding to a capacity in which a plurality of data blocks is arranged on the buffer for each writing; and
performing collective writing in the storage according to a result of a judgement.

10. The storage control method according to claim 8, wherein the write control includes a control to write a code to detect an error of the data in the data unit header.

11. The storage control method according to claim 8, wherein the write control includes control to write a data block header including a number of pieces of data to be stored in the data block, an index of data to be written next, and an offset of the data to be written next in the header area.

12. The storage control method according to claim 8, wherein the storage uses a storage medium having a limitation on a number of times of writing.

13. A non-transitory computer-readable recording medium recording a storage control program for causing a computer to execute processing comprising:
storing, in a memory, meta information which associates a logical address to identify data from an information processing device which uses a storage with a data block identifier to identify a data block which is used for an arrangement of the data on the storage and includes a header area with a capacity to store header information related to data corresponding to a plurality of indexes and a payload area with a capacity to store data corresponding to the plurality of indexes and an index indicating an order of additional writing of the data in the data block;
storing, in the memory, map information associating the data block identifier with a physical identifier indicating a physical position on the storage for the data block; specifying the data block and a write position in a payload area of the data block based on the physical identifier of the data block and the index;

writing the data in the specified data block; and performing a write control to write a data unit header including an offset area to which an offset indicating the write position in the data block is written and a data length area to which a data length indicating a length of the data is written at a position which is designated by the index in the header area.

14. The non-transitory computer-readable recording medium according to claim 13, further comprising:

writing the data in a corresponding data block on a buffer;

judging whether or not there is no available empty area in a collective writing unit area corresponding to a capacity in which a plurality of data blocks is arranged on the buffer for each writing; and performing collective writing in the storage according to a result of a judgement.

15. The non-transitory computer-readable recording medium according to claim 13, wherein the write control includes a control to write a code to detect an error of the data in the data unit header.

16. The non-transitory computer-readable recording medium according to claim 13, wherein the writing control includes a control to write a data block header including a number of pieces of data to be stored in the data block, an index of data to be written next, and an offset of the data to be written next in the header area.

17. The non-transitory computer-readable recording medium according to claim 13, wherein the storage uses a storage medium having a limitation on a number of times of writing.

* * * * *